United States Patent
Anderl et al.

(10) Patent No.: US 10,309,735 B2
(45) Date of Patent: *Jun. 4, 2019

(54) AIRFLOW SENSOR FOR A HEAT SINK

(71) Applicant: International Business Machines Corporation, Armonk, NY (US)

(72) Inventors: William J. Anderl, Rochester, MN (US); Bret P. Elison, Rochester, MN (US); Phillip V. Mann, Rochester, MN (US); Chelsie M. Peterson, Dexter, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,435

(22) Filed: Nov. 15, 2017

(65) Prior Publication Data

US 2018/0073824 A1    Mar. 15, 2018

Related U.S. Application Data

(63) Continuation of application No. 15/044,063, filed on Feb. 15, 2016, now Pat. No. 9,874,415.

(51) Int. Cl.
*G01F 1/69*     (2006.01)
*F28F 27/00*    (2006.01)
(Continued)

(52) U.S. Cl.
CPC .............. *F28F 27/00* (2013.01); *F28F 3/02* (2013.01); *G01F 1/383* (2013.01); *G01F 1/56* (2013.01);
(Continued)

(58) Field of Classification Search
CPC .... F28F 27/00; F28F 3/02; G01F 1/69; G01F 1/56; G01F 1/38
See application file for complete search history.

(56) References Cited

U.S. PATENT DOCUMENTS 3,691,833 A  9/1972  Fujikake et al.
5,612,677 A  5/1997  Baudry
(Continued)

OTHER PUBLICATIONS

Anderl et al., "Airflow Sensor for a Heat Sink" U.S. Appl. No. 14/958,405, filed Dec. 3, 2015.
(Continued)

*Primary Examiner* — Jewel V Dowtin
(74) *Attorney, Agent, or Firm* — Martin & Associates, LLC; Derek P. Martin

(57) ABSTRACT

An airflow sensor for a heat sink has a first portion having a first electrical point of contact, a second portion have a second electrical point of contact, and a deformable portion made of an electroactive material electrically coupled to the first and second portions. The deformable portion has first electrical properties measured between the first and second electrical points of contact when there is no airflow and the deformable portion is in a first position, and has second electrical properties different than the first electrical properties when a source of airflow blows air against the deformable portion, thereby causing the deformable portion to extend to a second position farther away from the source of airflow than the first position. The airflow sensor can be incorporated into a heat sink for an electronic component.

13 Claims, 5 Drawing Sheets

(51) Int. Cl.
  *F28F 3/02*  (2006.01)
  *G01F 1/38*  (2006.01)
  *G01F 1/56*  (2006.01)
  *F28D 21/00*  (2006.01)

(52) U.S. Cl.
  CPC ........ *G01F 1/69* (2013.01); *F28D 2021/0029* (2013.01); *F28F 2200/00* (2013.01)

(56) References Cited

U.S. PATENT DOCUMENTS

| | | | |
|---|---|---|---|
| 6,443,003 | B1 | 9/2002 | Bailis |
| 6,496,118 | B1 | 12/2002 | Smith |
| 6,516,785 | B1 | 2/2003 | Nakada et al. |
| 9,874,415 | B2 * | 1/2018 | Anderl .................. F28F 27/00 |
| 2003/0090883 | A1 | 5/2003 | Asahi et al. |
| 2008/0040067 | A1 | 2/2008 | Bashor et al. |
| 2009/0210190 | A1 | 8/2009 | Carlson et al. |
| 2010/0123240 | A1 | 5/2010 | Sato et al. |
| 2011/0272768 | A1 | 11/2011 | Nakamura et al. |
| 2012/0199310 | A1 | 8/2012 | Koenig et al. |
| 2015/0000395 | A1 | 1/2015 | Tashiro et al. |

OTHER PUBLICATIONS

Anderl et al., "Airflow Sensor for a Heat Sink" U.S. Appl. No. 15/044,063, filed Feb. 15, 2016.
Anderl et al., "Airflow Sensor for a Heat Sink" U.S. Appl. No. 15/979,453, filed May 14, 2018.
Appendix P—List of IBM Patents or Patent Applications Treated as Related, dated Jun. 14, 2018.
Appendix P—List of IBM Patents or Patent Applications Treated as Related, dated Apr. 23, 2018.
Azar, Kaveh, "ATS White Paper—Air Flow Measurement in Electronic Systems", May 13, 2015.
Swapnali et al., "Experimantal Analysis of Heat Transfer Enhancement Using Fins", International Journal for Technological Research in Engineering, vol. 1, Issue 11, Jul. 2014.

* cited by examiner

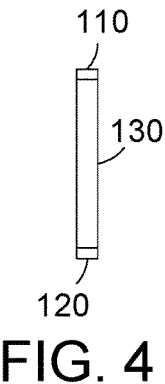 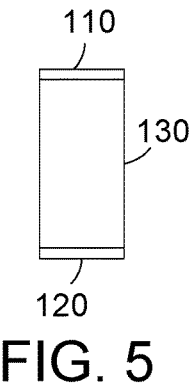 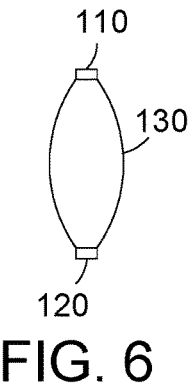 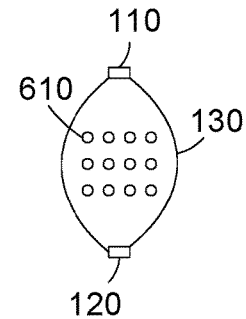
FIG. 4    FIG. 5    FIG. 6    FIG. 7
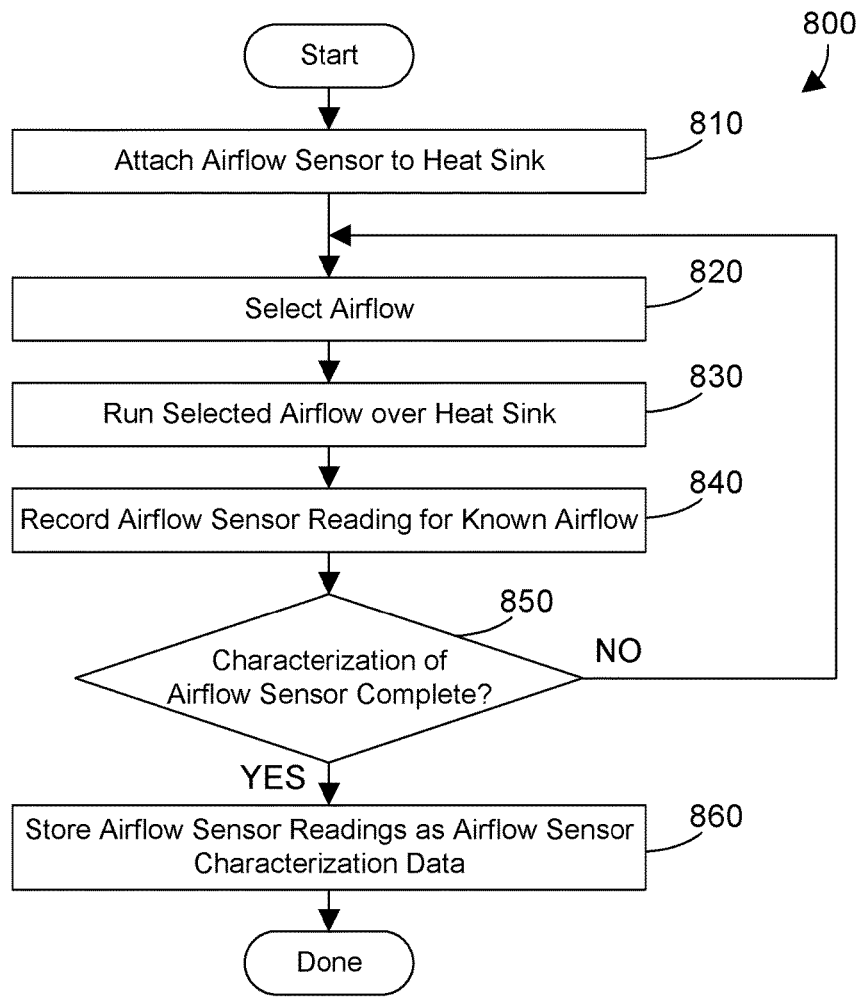
FIG. 8

AIRFLOW SENSOR FOR A HEAT SINK

BACKGROUND

1. Technical Field

This disclosure generally relates to airflow sensors, and more specifically relates to an airflow sensor for a heat sink.

2. Background Art

Heat sinks are commonly used in modern electronic systems to dissipate heat generated by electronic components, such as processors. A source of air such as a fan is typically placed in proximity to a heat sink to produce airflow over the heat sink, which enhances the ability of the heat sink to dissipate heat.

Modern heat sinks are typically modeled using thermal simulation. Prototypes are then built, which are qualified with thermal test vehicles and flow benches. However, even with thermal simulation and flow bench qualification, a heat sink may behave differently in a system than modeled. Oftentimes the internal environment is difficult to predict and model.

SUMMARY

An airflow sensor for a heat sink has a first portion having a first electrical point of contact, a second portion have a second electrical point of contact, and a deformable portion made of an electroactive material electrically coupled to the first and second portions. The deformable portion has first electrical properties measured between the first and second electrical points of contact when there is no airflow and the deformable portion is in a first position, and has second electrical properties different than the first electrical properties when a source of airflow blows air against the deformable portion, thereby causing the deformable portion to extend to a second position farther away from the source of airflow than the first position. The airflow sensor can be incorporated into a heat sink for an electronic component.

The foregoing and other features and advantages will be apparent from the following more particular description, as illustrated in the accompanying drawings.

BRIEF DESCRIPTION OF THE DRAWING(S)

The disclosure will be described in conjunction with the appended drawings, where like designations denote like elements, and:

FIGS. 4-7 show various possible configurations for the airflow sensor 100 shown in FIGS. 1-3;

FIG. 8 is a flow diagram of a method for characterizing an airflow sensor;

DETAILED DESCRIPTION

The disclosure and claims herein relate to an airflow sensor for a heat sink that has a first portion having a first electrical point of contact, a second portion have a second electrical point of contact, and a deformable portion made of an electroactive material electrically coupled to the first and second portions. The deformable portion has first electrical properties measured between the first and second electrical points of contact when there is no airflow and the deformable portion is in a first position, and has second electrical properties different than the first electrical properties when a source of airflow blows air against the deformable portion, thereby causing the deformable portion to extend to a second position farther away from the source of airflow than the first position. The airflow sensor can be incorporated into a heat sink for an electronic component.

Figure 1:
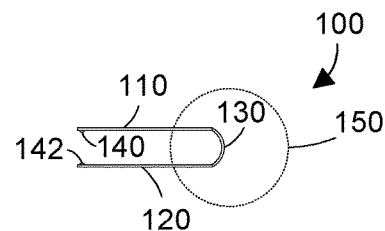
FIG. 1 is a side view of an airflow sensor.

Referring to FIG. 1, an airflow sensor 100 comprises a first portion 110, a second portion 120, and a deformable portion 130 made of an electroactive material having a first end connected to the first portion 110 and a second end opposite the first end connected to the second portion 120. The first portion 110 and second portion 120 are made of an electrically conductive material. The first portion 110 includes a corresponding first electrical point of contact 140, and the second portion 120 includes a corresponding second electrical point of contact 142. In one suitable implementation, the first portion 110 and second portion 120 are made of metal, and are connected to the deformable portion 130, which is made of an electroactive material. In another suitable implementation, the first portion 110, second portion 120, and deformable portion 130 are all made from a single piece of electroactive material. Measuring resistance between the first and second electrical points of contact 140 and 142 results in a resistance reading that varies according to the degree to which the deformable portion 130 is extended due to airflow.

Figure 2:
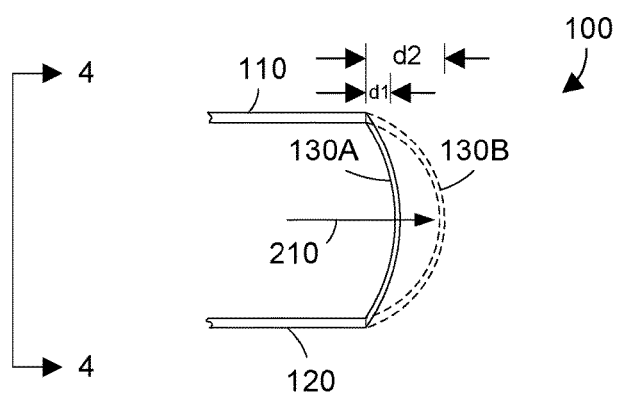
FIG. 2 is an enlarged partial side view of the airflow sensor of FIG. 1 showing how the deformable portion extends with airflow.

FIG. 1 includes a portion 150 that is shown enlarged in FIG. 2 to demonstrate the deformation of the deformable portion in the presence of airflow. Deformable portion 130 is shown in a first position 130A in the absence of airflow. For the specific configuration shown in FIG. 2, a distance d1 represents the position of the rightmost portion of the deformable portion in position 130A from the points where the deformable portion 130 is connected to the first and second portions 110 and 120 in the absence of airflow. In the presence of airflow, represented in FIGS. 2 and 3 by arrow 210 in the direction shown, the deformable portion 130 extends to a second position 130B farther away from the source of the airflow than the first position 130A, as shown by position 130B being a distance d2 that is farther in the direction of the airflow from the points where the deformable portion is connected to the first and second portions 110 and 120 than when the deformable portion is in position 130A. One can readily see from FIG. 2 that airflow extends the deformable portion 130, and the deformation of the deformable portion 130 can thus be used to detect airflow. While two positions 130A and 130B are shown in FIG. 2, one skilled in the art will recognize the deformable portion 130 may extend to a number of different positions depending on the speed of the airflow, which means the electrical properties between the first and second contact points 140 and 142 can characterize the speed of airflow detected by the airflow sensor 100.

FIGS. 1 and 2 show side views of the airflow sensor 100, which does not indicate the width of the airflow sensor 100 that would be in contact with the airflow 210. At one extreme, the airflow sensor 100 could have a cross-section with respect to the airflow 210 that is very small, meaning the airflow sensor 100 could have a width of a human hair or less. At the other extreme, the airflow sensor 100 could have a cross-section with respect to the airflow 210 that is significant, meaning the airflow sensor 100 substantially disrupts the airflow 210. In the most preferred implementation, the airflow sensor 100 has a geometry resembling a flat ribbon that is preferably more than a millimeter and less than ten millimeters wide. This flat ribbon geometry allows sufficient surface area for the airflow 210 to deform the deformable portion 120 without significantly disrupting the airflow 210. In addition, thickness of the ribbon could be adjusted according to airflow ranges. Thus, a thicker ribbon could be used to provide a reasonable deformation across the range of airflow when the expected airflow is high. A thinner ribbon could be used when the expected airflow is low. Using an appropriate specific design of airflow sensor 100 allows measuring airflow without significantly disrupting the airflow.

The deformable portion 130 is preferably made from an electroactive material, such as one or more piezoelectric filaments or an electroactive polymer. Electroactive materials are sometimes used in a first mode of operation by applying an electrical signal such as a voltage across the electroactive material, which causes the electroactive material to change shape. When the voltage is removed, the electroactive material resumes its previous shape. Electroactive materials can additionally be used in a second mode of operation where the shape is changed due to external forces, and the difference in electrical properties between two contact points can be measured and represents the change in shape. The airflow sensor disclosed herein operates in the second mode of operation by allowing airflow to extend the deformable portion, and the change in shape can be measured according to changed electrical properties between the contact points. The deformable portion 130 thus serves as an elastic wind sock of sorts, extending according to the speed of the airflow, which allows measuring the airflow by measuring the difference in electrical properties between the contact points. In the most preferred implementation, extending the deformable portion 130 due to airflow causes a change in electrical resistance between the contact point 140 and 142, which can be measured and correlated to a speed of the airflow.

The airflow sensor 100 could be made from any suitable material or combination of materials. In the most preferred implementation, the first portion 110, the second portion 120, and the deformable portion 130 are all made of the same electroactive material. Suitable electroactive materials include one or more piezoelectric filaments and an electroactive polymer. Of course, other electroactive materials could also be used. In an alternative implementation, the first portion 110 and second portion 120 are made of metal, and are electrically coupled to the deformable portion 130, which is made of an electroactive material. Any suitable metal could be used for first and second portions 110 and 120, including copper, nickel, indium or tin. Of course, alloys of different metals could also be used. In addition, non-metallic conductors or semiconductors could also be used. Any suitable materials for the airflow sensor 100 could be used as long as the deformable portion 130 deforms under the force of airflow, which causes electrical properties between the contact points 140 and 142 that vary as a function of speed of the airflow.

Figure 3:
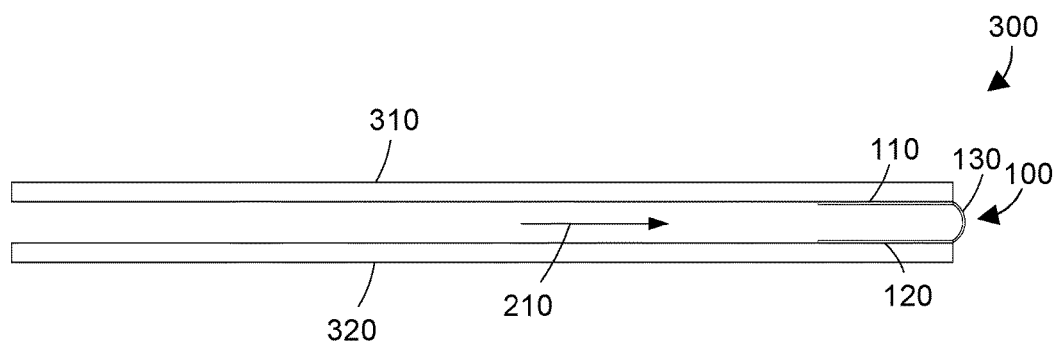
FIG. 3 is a side view of the airflow sensor of FIG. 1 mounted between two fins on a heat sink.

The airflow sensor 100 shown in FIGS. 1 and 2 can be used to measure airflow on a heat sink. Referring to FIG. 3, two fins 310 and 320 of a heatsink 300 are shown. Of course, the heat sink 300 could include other fins not shown in FIG. 3. The airflow sensor 100 is placed between fins 310 and 320 by bonding the first portion 110 to a lower surface of fin 310 and by bonding the second portion 120 to the upper surface of fin 320, as shown in FIG. 3. In one suitable implementation, either the first portion 110 could be electrically coupled to the fin 310 or the second portion 120 could be electrically coupled to the fin 320. In the most preferred implementation, both first portion 110 and second portion 120 are electrically insulated from the fins 310 and 320. Bonding the first portion 110 and second portion 120 is a way to permanently attach the airflow sensor 100 at a desired location on a heat sink. If a temporary attachment is needed, instead of bonding the first portion 110 and second portion 120 to the fins of the heat sink, removable mechanical couplings such as clips or springs could be used so the airflow sensor 100 can be relocated to different positions on the heat sink as needed.

In the configuration shown in FIG. 3, the airflow sensor 100 will produce different values of electrical resistance with different amounts of airflow between the first fin 310 and second fin 320. Because the airflow sensor 100 minimally disrupts the airflow, the airflow sensor 100 provides crucial airflow information for a heat sink in an operating environment in a manner that does not significantly negatively impact the performance of the heat sink.

The placement of the airflow sensor 100 in FIG. 3 is shown on the right edge of the heatsink. Note, however, the airflow sensor 100 could be placed anywhere along the length of the heatsink 300 provided there is no obstruction to the airflow. Thus, airflow sensor 100 in FIG. 3 could be moved to the middle of heat sink 300 or to the left edge of heatsink 300. The disclosure and claims herein extend to any suitable location for the airflow sensor 100 on a heat sink 300.

Figure 12:
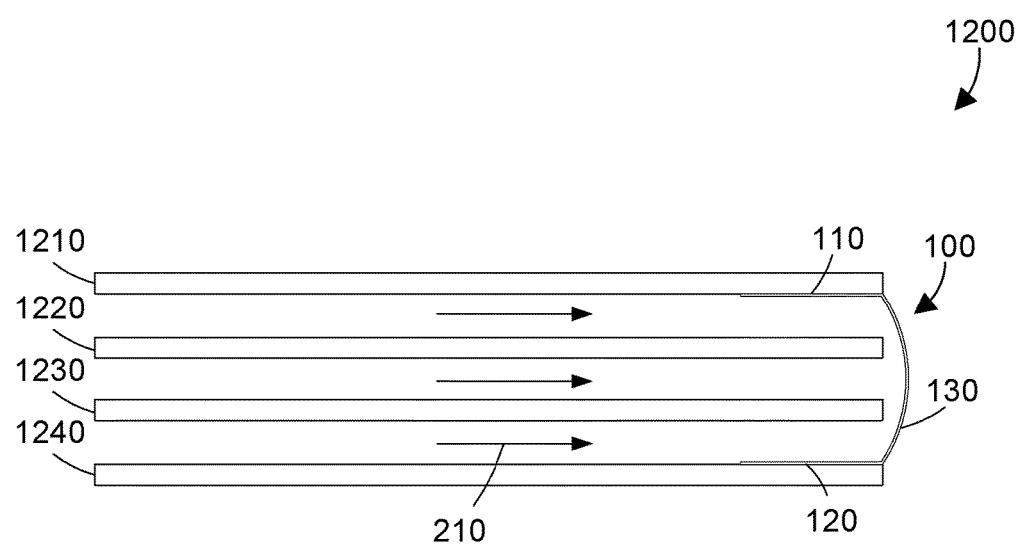
FIG. 12 is a side view of the airflow sensor of FIG. 1 mounted to span four fins on a heat sink.

The airflow sensor could span multiple fins of a heat sink, as shown in FIG. 12. The airflow sensor 100 in FIG. 12 spans four fins 1210, 1220, 1230 and 1240. The airflow sensor 100 can thus detect airflow flowing between these four fins. The disclosure and claims herein expressly extend to any suitable location on a heatsink for the airflow sensor, whether spanning two fins or multiple fins.

The side view in FIG. 2 shows how the deformable portion 130 deforms without knowing the width or shape of the deformable portion 130. FIGS. 4-7 show various possible configurations for airflow sensor 100 shown in FIG. 2, and represent end views of different configurations in FIG. 2 taken along the line 4-4. FIG. 4 shows a narrow ribbon configuration where the first portion 110, second portion 120 and deformable portion 130 all have the same relatively narrow width. FIG. 5 shows a wider ribbon configuration where the first portion 110, second portion 120 and deformable portion 130 all have the same wider width. FIG. 6 shows a configuration where the first and second portions 120 have a relatively narrow width, and the deformable portion 130 has narrow ends that connect to the first and second portions 110 and 120 with a wider center that has a larger cross-section for catching air, like a sail. FIG. 7 shows a configuration where the first and second portions 110 and 120 have a relatively narrow width, and the deformable portion 130 has narrow ends that connect to the first and second portions with a wider center that includes multiple openings 610. Many other configurations not shown in FIGS. 4-7 could also be used, including multiple filaments or strands, or any suitable shape or configuration that includes no holes or any suitable number of holes. The deformable portion 130 may include any suitable configuration as long as the electrical properties measures between the contact points 140 and 142 vary according to the speed of airflow.

While it is possible the airflow sensor 100 could be designed to provide resistance between the two electrical points 140 and 142 that is linearly proportional to airflow, other designs that do not provide such linear proportionality could also be used. In the most preferred implementation, the airflow sensor is tested and characterized so its performance is known, and future readings can be compared to the characterization data to determine airflow. Referring to FIG. 8, method 800 begins by attaching an airflow sensor to a heat sink (step 810), such as the configuration shown in FIG. 3. Next, the heat sink is placed on a flow bench, and a particular airflow is selected (step 820). The selected airflow is then run over the heat sink (step 830). The airflow sensor reading is recorded for the known airflow (step 840). We assume steps 820, 830 and 840 are repeated for several different airflows, so step 850=NO, and these steps are repeated with a different selected airflow. This characterization of airflow sensor readings to airflow continues until characterization of the airflow sensor is complete (step 850=YES), at which point the airflow sensor readings are stored as airflow sensor characterization data (step 860). The airflow sensor characterization data stored in step 860 can then be used to determine airflow over the airflow sensor at any given point in time based on the electrical resistance readings of the airflow sensor.

Figure 9:
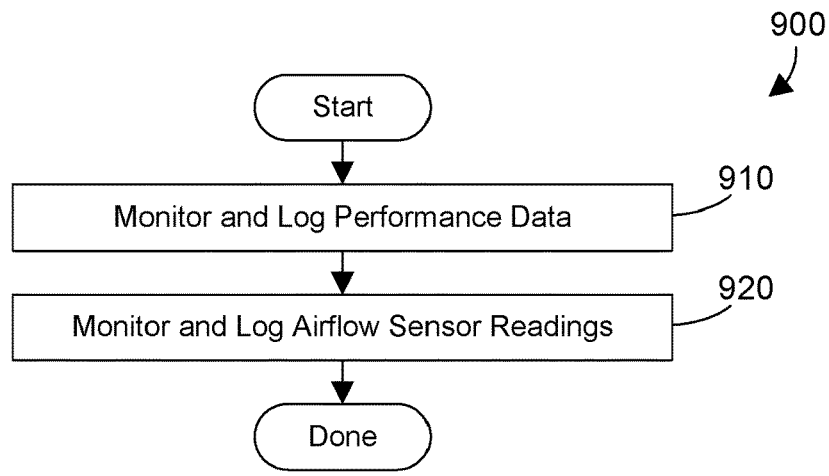
FIG. 9 is a flow diagram of a method for logging information as an electronic system runs.

Electronic systems often log performance data. Referring to FIG. 9, method 900 monitors and logs performance data for an electronic system (step 910), and additionally logs the airflow sensor readings (step 920). Logging airflow sensor readings at the same time other performance parameters are logged provides data from which airflow can be determined at particular points in time that correlate to the logged performance data.

Figure 10:
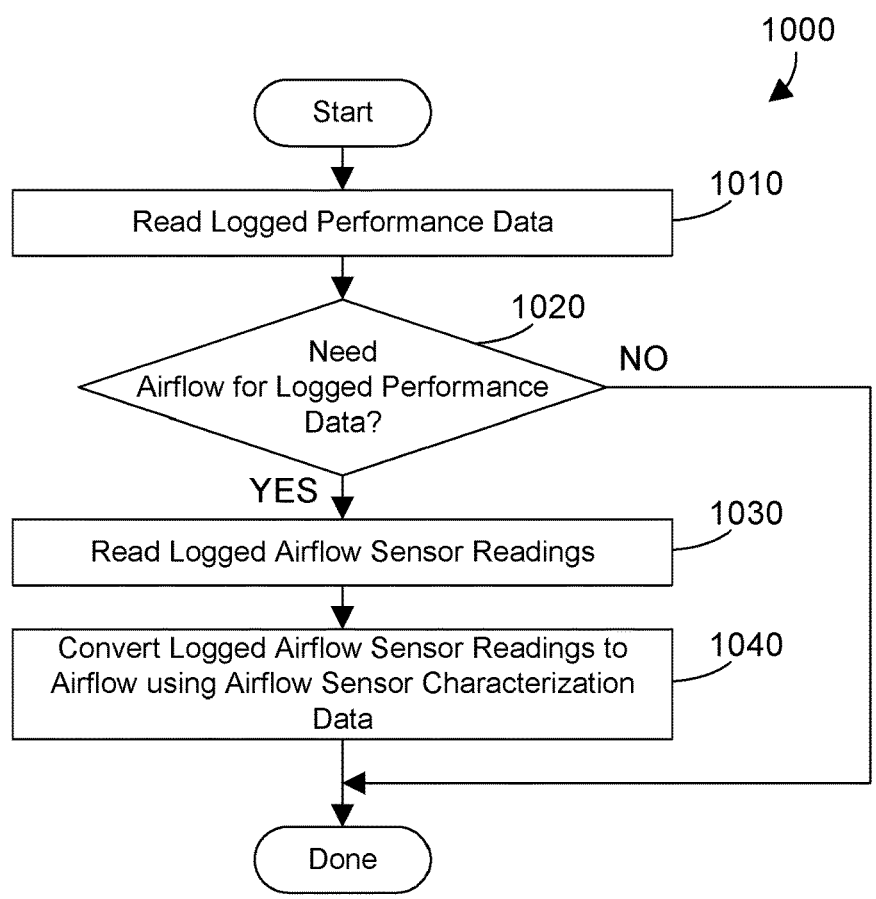
FIG. 10 is a flow diagram of a method for determining airflow in an electronic system using the airflow sensor.

Referring to FIG. 10, a method 1000 begins by reading the logged performance data (step 1010). When airflow for the logged performance data is not needed (step 1020=NO), method 1000 is done. For example, if the logged performance data is read in step 1010 to determine memory utilization at a particular point in time, airflow will not affect memory utilization, so the airflow information is not needed. When airflow for the logged performance data is needed (step 1020=YES), the logged airflow sensor readings are read (step 1030), then converted to airflow using the airflow sensor characterization data (step 1040). Method 1000 thus provides logged performance data correlated with airflow, which allows determining whether airflow could have contributed to a logged event. For example, when a processor experiences a power throttling event, knowing the airflow at the time of the power throttle could provide an indication of whether proper airflow was being applied to the heat sink.

Figure 11:
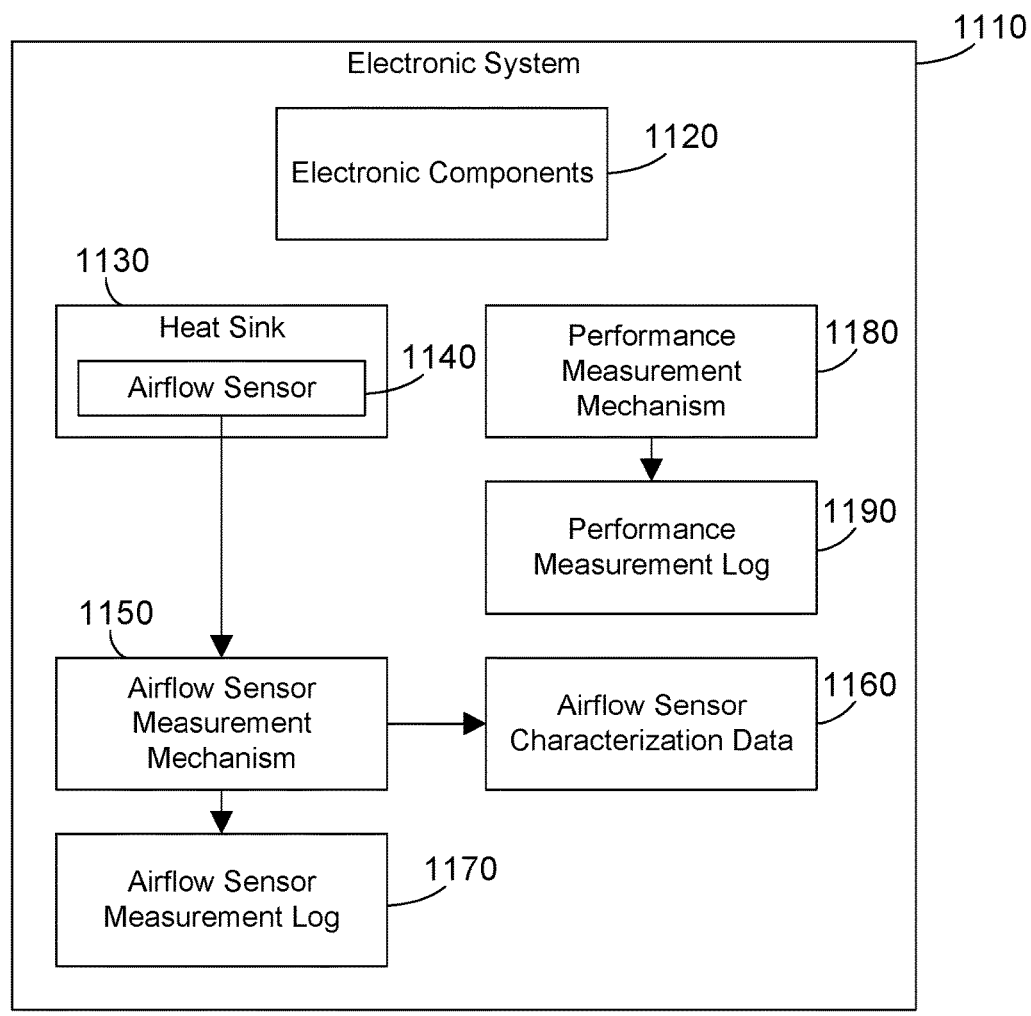
FIG. 11 is a block diagram of an electronic system that includes a heat sink with an airflow sensor as described and claimed herein.

Referring to FIG. 11, an electronic system 1110 is shown, which includes electronic components 1120. Electronic components 1120 can include any type of electronic components, systems or subsystems, including without limitation processors, memory, integrated circuits, discrete logic, hard disk drives, I/O adapters, etc. A performance measurement mechanism 1180 monitors and logs data in a performance measurement log 1190. A heat sink 1130 is provided for one or more of the electronic components 1120 that includes an airflow sensor 1140. Airflow sensor 100 shown in FIGS. 1-3 is one suitable implementation for airflow sensor 1140 in FIG. 1. The airflow sensor 1140 is connected to an airflow sensor measurement mechanism 1150, which measures readings from the airflow sensor 1140. In one suitable implementation, the readings could be electrical resistance. In another suitable implementation, the airflow sensor measurement mechanism 1150 could measure a voltage across the airflow sensor 1140. When steps are taken to characterize an airflow sensor as shown in method 800 in FIG. 8, the airflow sensor characterization data stored in step 860 is represented as 1160 in FIG. 11. An airflow sensor measurement log 1170 preferably includes airflow sensor measurements over time. In the most preferred implementation, both the performance measurement log 1190 and airflow sensor measurement log 1170 have timestamped entries that allow correlating the two. Thus, if the performance measurement mechanism 1180 determines processor temperature rose at a given point in time, the airflow sensor measurement log 1170 can be consulted to determine the airflow through the processor's heatsink at the same point in time. Correlating airflow to logged system events thus provides a way to determine whether airflow was a contributing factor in the logged system events.

Many variations are possible within the scope of the disclosure and claims herein. For example, while a single airflow sensor on a single heatsink is shown in FIG. 3, multiple airflow sensors could be used on a single heatsink, and a single airflow sensor could be used between two adjacent heatsinks. The use of multiple airflow sensors in different regions of a heatsink could be very helpful in testing and characterizing performance of a heat sink. In addition, multiple airflow sensors that have different properties could be used together. For example, three airflow sensors could be used on a heat sink, with a first airflow sensor that measures airflow up to a first threshold, a second airflow sensor that measures airflow from the first threshold to a second threshold, and the third airflow sensor that measure airflow from the second threshold to a third threshold. The disclosure and claims herein expressly extend to any suitable number of airflow sensors in any suitable configuration for measuring airflow on one or more heat sinks.

An airflow sensor for a heat sink has a first portion having a first electrical point of contact, a second portion have a second electrical point of contact, and a deformable portion made of an electroactive material electrically coupled to the first and second portions. The deformable portion has first electrical properties measured between the first and second electrical points of contact when there is no airflow and the deformable portion is in a first position, and has second electrical properties different than the first electrical properties when a source of airflow blows air against the deformable portion, thereby causing the deformable portion to extend to a second position farther away from the source of airflow than the first position. The airflow sensor can be incorporated into a heat sink for an electronic component.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A method for characterizing a heat sink in an electronic system, the method comprising:
   (A) attaching an airflow sensor to the heat sink;

(B) selecting an airflow;

(C) running the selected airflow over the heat sink;

(D) recording a reading from the airflow sensor for the desired airflow;

(E) repeating steps (B) through (D) for a plurality of airflows; and (F) storing the readings recorded in step (D) for the plurality of airflows as airflow sensor characterization data.

2. The method of claim 1 wherein the airflow sensor comprises a first portion having a first electrical point of contact and a second portion have a second electrical point of contact.

3. The method of claim 2 wherein the first and second portions are made of a same electrically conductive material.

4. The method of claim 3 wherein the electrically conductive material comprises metal.

5. The method of claim 2 wherein electrical resistance between the first and second electrical points of contact is a function of airflow through the airflow sensor.

6. The method of claim 2 wherein voltage between the first and second electrical points of contact is a function of airflow through the airflow sensor.

7. The method of claim 2 wherein the airflow sensor further comprises a deformable portion made of an electroactive material, the deformable portion having a first end electrically coupled to the first portion and a second end opposite the first end electrically coupled to the second portion, wherein the deformable portion has first electrical properties measured between the first and second electrical points of contact when there is no airflow and the deformable portion is in a first position, and has second electrical properties measured between the first and second electrical points of contact different than the first electrical properties when a source of airflow blows air against the deformable portion, thereby causing the deformable portion to extend to a second position farther away from the source of airflow than the first position.

8. The method of claim 7 wherein the first and second portions are made of the same electroactive material as the deformable portion.

9. The method of claim 7 wherein the first and second portions and the deformable portion are made from a single piece of electroactive material.

10. The method of claim 7 wherein the electroactive material comprises at least one piezoelectric filament.

11. The method of claim 7 wherein the electroactive material comprises an electroactive polymer.

12. The method of claim 2 wherein step (D) comprises:

measuring electrical resistance between the first electrical point of contact and the second electrical point of contact; and recording the measured electrical resistance as correlating to the selected airflow.

13. The method of claim 1 further comprising:

monitoring and logging performance of the electronic system;

monitoring and logging readings of the airflow sensor corresponding to the logged performance of the electronic system; and converting the logged readings of the airflow sensor to airflows using the airflow sensor characterization data.

* * * * *